United States Patent [19]

Hildebrandt et al.

[11] 4,093,088
[45] June 6, 1978

[54] UNDERFLOOR TIRE STORAGE

[75] Inventors: William V. Hildebrandt; Allan G. Miller, both of Sterling Heights, Mich.

[73] Assignee: General Motors Corporation, Detroit, Mich.

[21] Appl. No.: 796,127

[22] Filed: May 12, 1977

[51] Int. Cl.² ............................................. B62D 43/04
[52] U.S. Cl. .................................. 214/451; 224/42.21; 224/42.23
[58] Field of Search ................. 224/42.06, 42.12, 42.2, 224/42.21, 42.23, 42.28, 42.29; 296/37.2; 214/451, 452, 453, 454

[56] References Cited

U.S. PATENT DOCUMENTS

| 1,813,094 | 7/1931 | Appel | 214/451 |
| 3,782,568 | 1/1974 | Alexander | 214/451 X |

FOREIGN PATENT DOCUMENTS

| 1,494,180 | 7/1966 | France | 296/37.2 |

Primary Examiner—Trygve M. Blix
Assistant Examiner—Winston H. Douglas
Attorney, Agent, or Firm—K. H. MacLean, Jr.

[57] ABSTRACT

An underfloor spare tire stowage or carrier assembly for a vehicle of the type having a relatively short rear overhang of the body behind the rear wheels. A tire cradle of bent rod construction directly supports the tire and consists of crossed arm portions which extend under the tire to provide vertical support. The rearward parts of the arm portions are integrally formed in bent rod fashion to provide vertical portions which position the tire horizontally and prevent its rearward movement. The forward parts of the arm portions are connected to guide members which are slidably mounted upon spaced parallel legs of a tire cradle support. The tire cradle support is also of bent rod construction and defines a generally U-shaped member including the spaced parallel legs which are pivoted at their forward ends to part of the vehicle frame. Handle means projecting through an opening in the trunk floor supports the rearward portions of the tire cradle and the support. Lowering of the handle permits vertical movement of the cradle and support from its raised stored position to its downward unload position resting on the ground so that the tire and cradle may be subsequently slid rearward as permitted by the movement of the guides on the parallel legs of the cradle support.

3 Claims, 6 Drawing Figures

UNDERFLOOR TIRE STORAGE

This invention relates to underfloor spare tire stowage and, particularly, to a tire support of bent rod construction including mechanism to first lower the tire cradle and tire downward and then slide the cradle and tire rearward, thus clearing the rear end of the vehicle for tire removal.

The subject invention provides an inexpensive, yet very convenient tire support and carrier for a vehicle. The placement of the spare tire beneath the trunk floor is not new, but previous underfloor attempts have resulted in great difficulty upon removal of the spare tire. Several arrangements have been attempted to alleviate problems associated with underfloor stowage, including cable supports for the tire with a windup mechanism attached thereto. This method involves relatively complicated mechanisms which are subject to damage or wear. On the other hand, use of a cradle which simply drops downward without providing rearward movement of the tire creates difficulties when tire removal is attempted.

The subject application discloses a tire carrier assembly for underfloor stowage which is fabricated of inexpensive steel rods which are simply bent and joined together in a novel manner permitting easy removal of the spare. Specifically, a tire cradle is utilized with generally horizontal crossed arm portions to vertically support the tire. Vertically extending portions created by bends of the ends of the crossed arm portions position the tire in a horizontal direction beneath the car. The forward ends of the cradle are pivotally attached to guides which slide in a fore and aft direction upon parallel legs of a cradle support member. The cradle support is pivotally attached to the vehicle at a forward location. A lowering handle and lock mechanism projecting through an opening in the trunk floor engages the rear of the cradle and cradle support assembly so that the tire may be lowered to the ground. After the rear portion of the tire cradle is lowered to a ground-engaging position, the cradle may be grasped and pulled rearward as controlled by the sliding action between the guides and the legs of the cradle support. Thereby, the tire is moved rearward to clear the overhang of the vehicle body for convenient lifting from the tire cradle.

Further advantageous features and characteristics of the subject invention will be more readily apparent from a reading of the following detailed description of the invention, reference being had to the accompanying drawings in which a preferred embodiment is illustrated.

Figure 1:
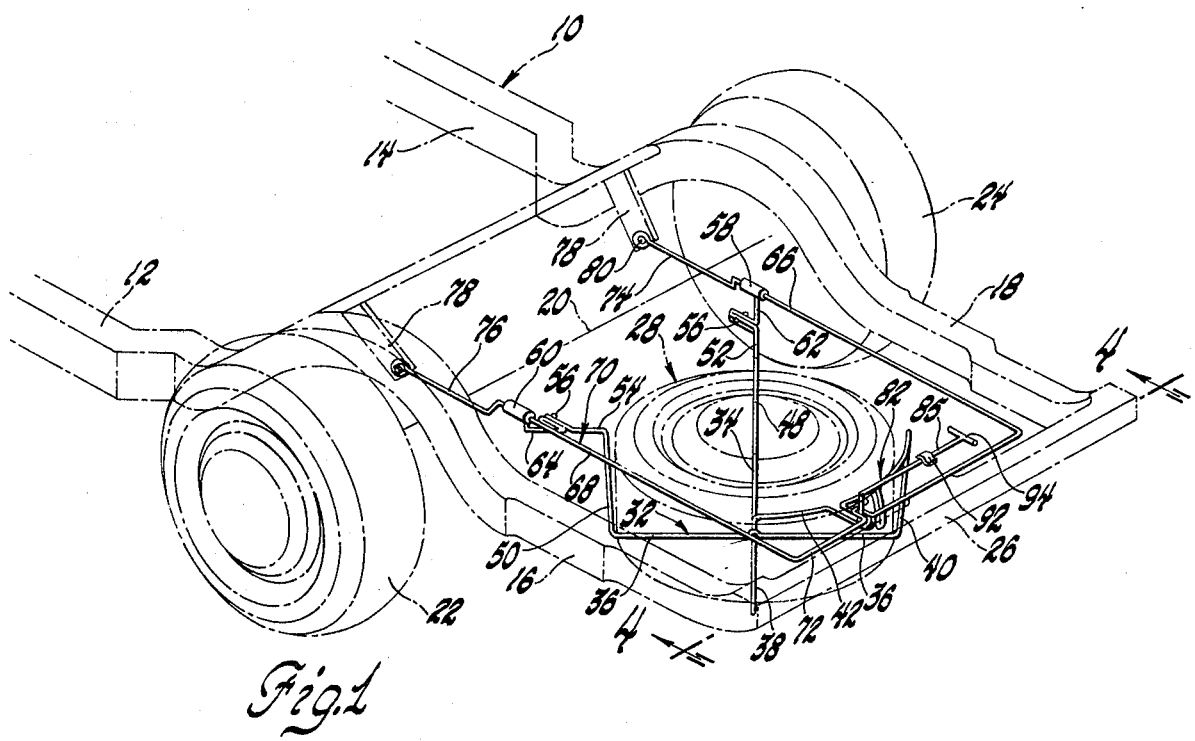
FIG. 1 is a perspective view of the subject tire support and carrier between vehicle frame members with the tire support in its upward stowed position.
Figure 2:
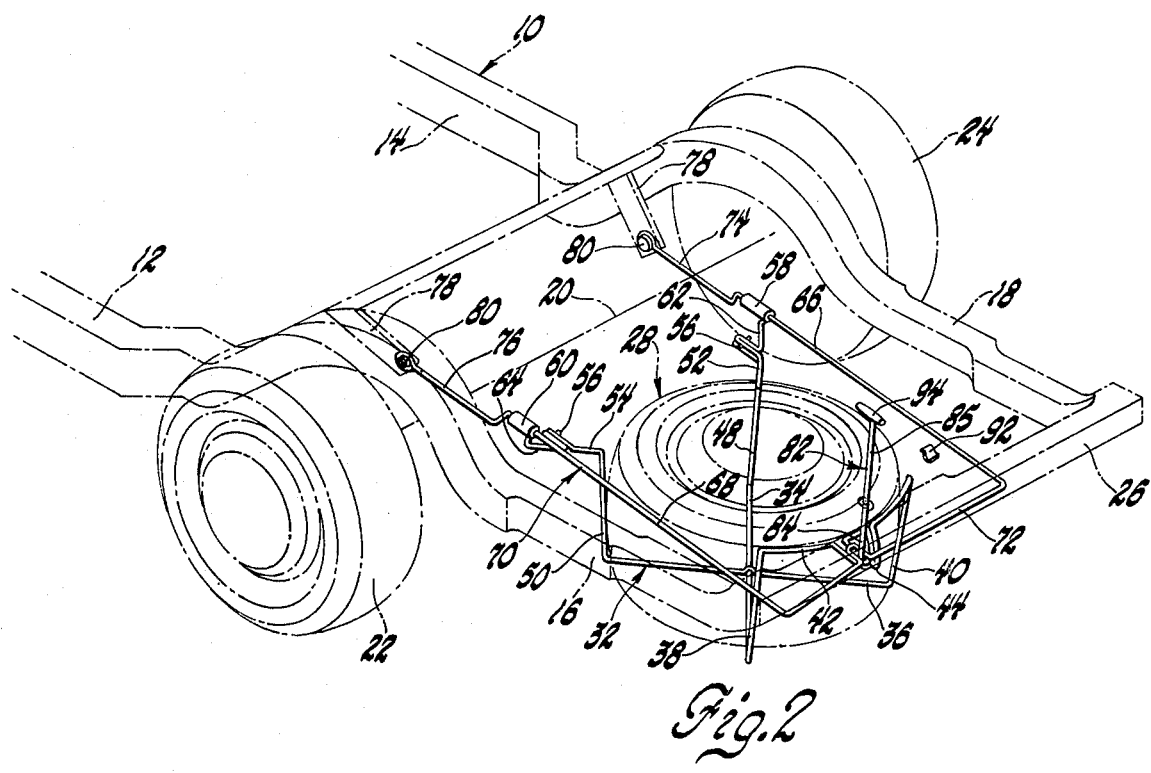
FIG. 2 is a view similar to FIG. 1 but with the tire and cradle pivoted downward from its stowed position.
Figure 3:
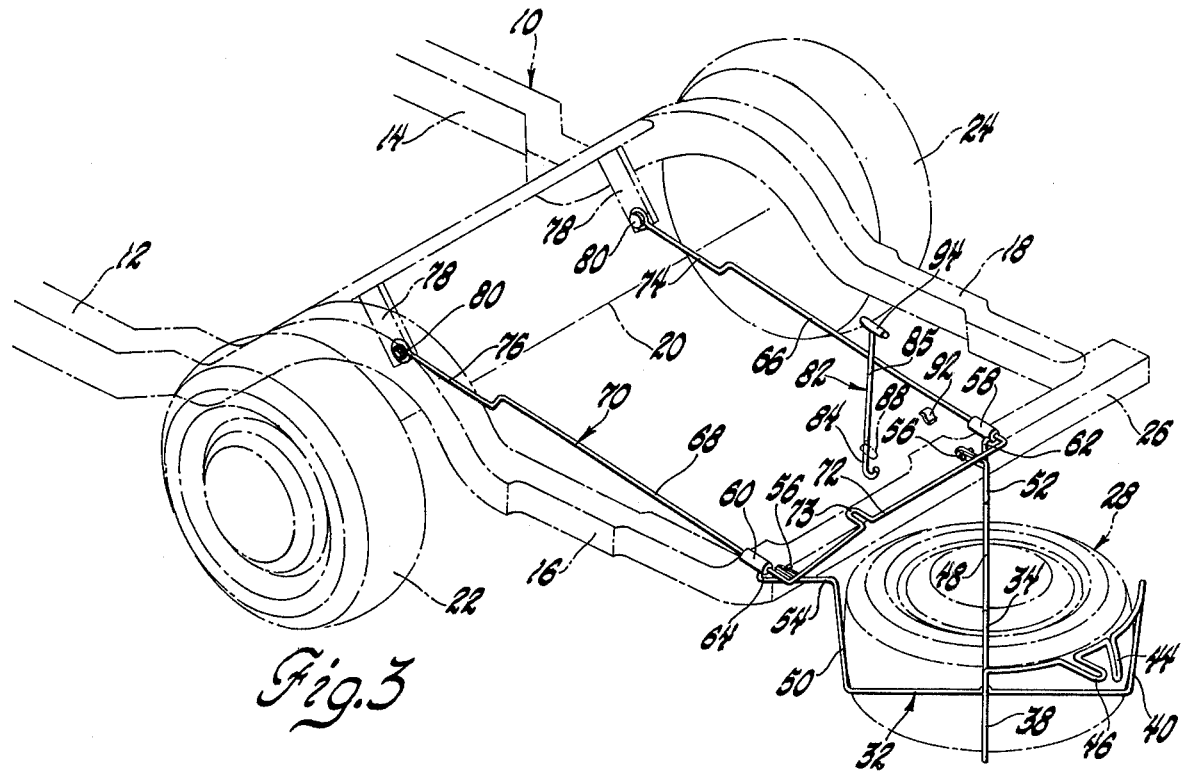
FIG. 3 is a view similar to FIGS. 1 and 2 showing the cradle support in its lowered position wih the tire and cradle slid rearward to clear the vehicle overhang.

In FIGS. 1-3, a vehicle frame 10 is illustrated, including generally parallel fore and aft side rails 12 and 14. The side rails include rear extended portions 16, 18 which project rearward beyond the transverse rear axle whose location is represented generally by the line 20 extending through the center of the rear tires 22, 24. Details of the axle are not shown in order to minimize the complexity of the drawing so that the subject tire carrier is not obscured. The axle itself is not significant in the present invention. An end frame or tie member 26 extends on a transverse axis between the ends of the rear extensions 16 and 18.

Figure 4:
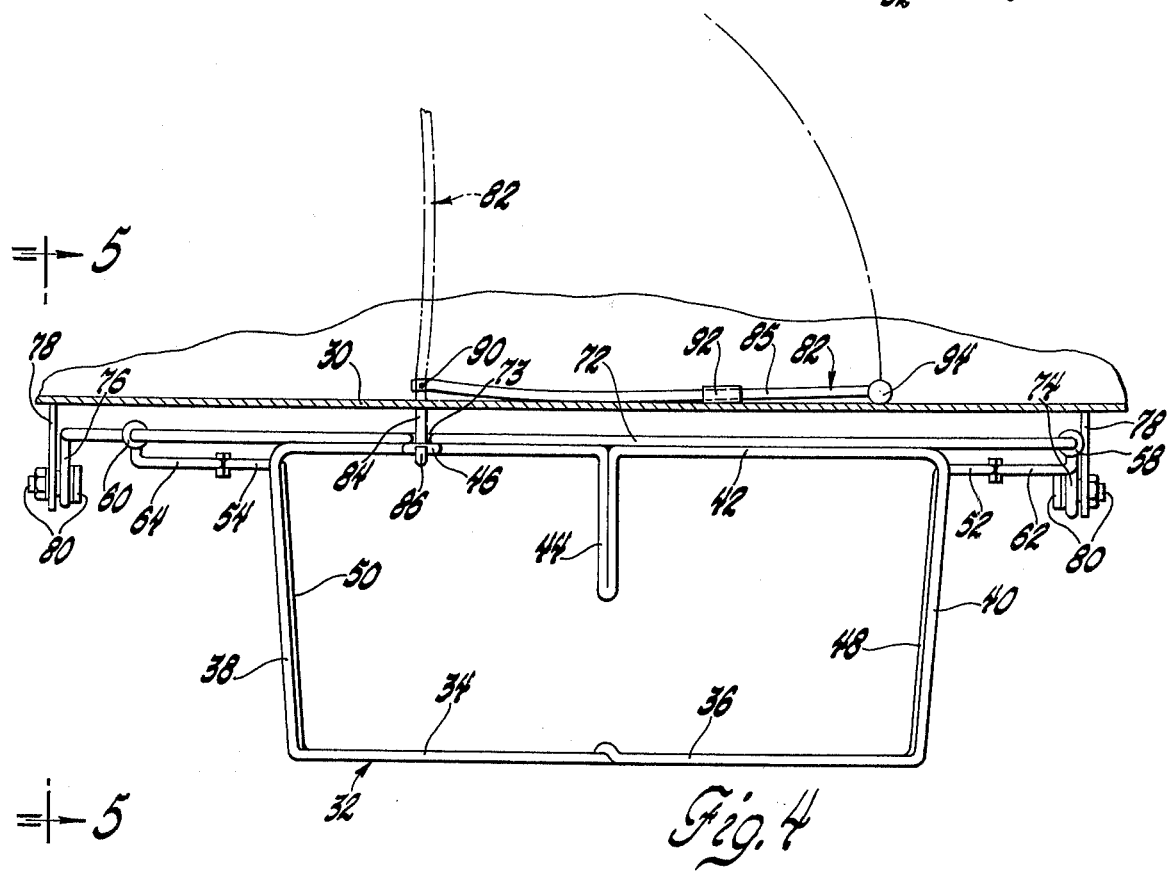
FIG. 4 is a rear elevational view of the spare tire support and carrier taken along lines 4—4 in FIG. 1 and looking in the direction of the arrows.
Figure 5:
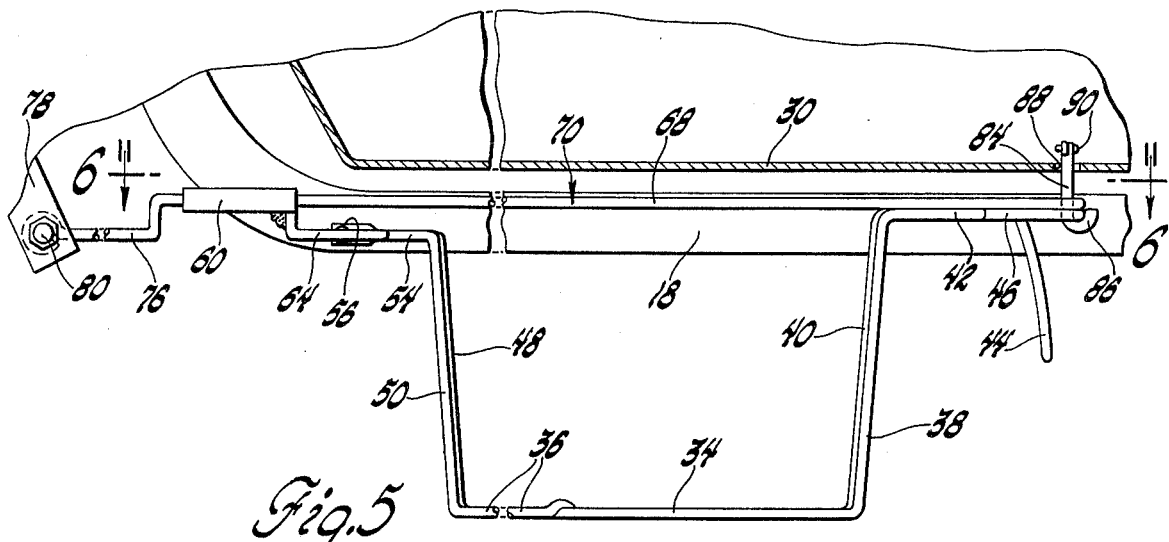
FIG. 5 is a view taken along lines 5—5 in FIG. 4 and looking in the direction of the arrows.
Figure 6:
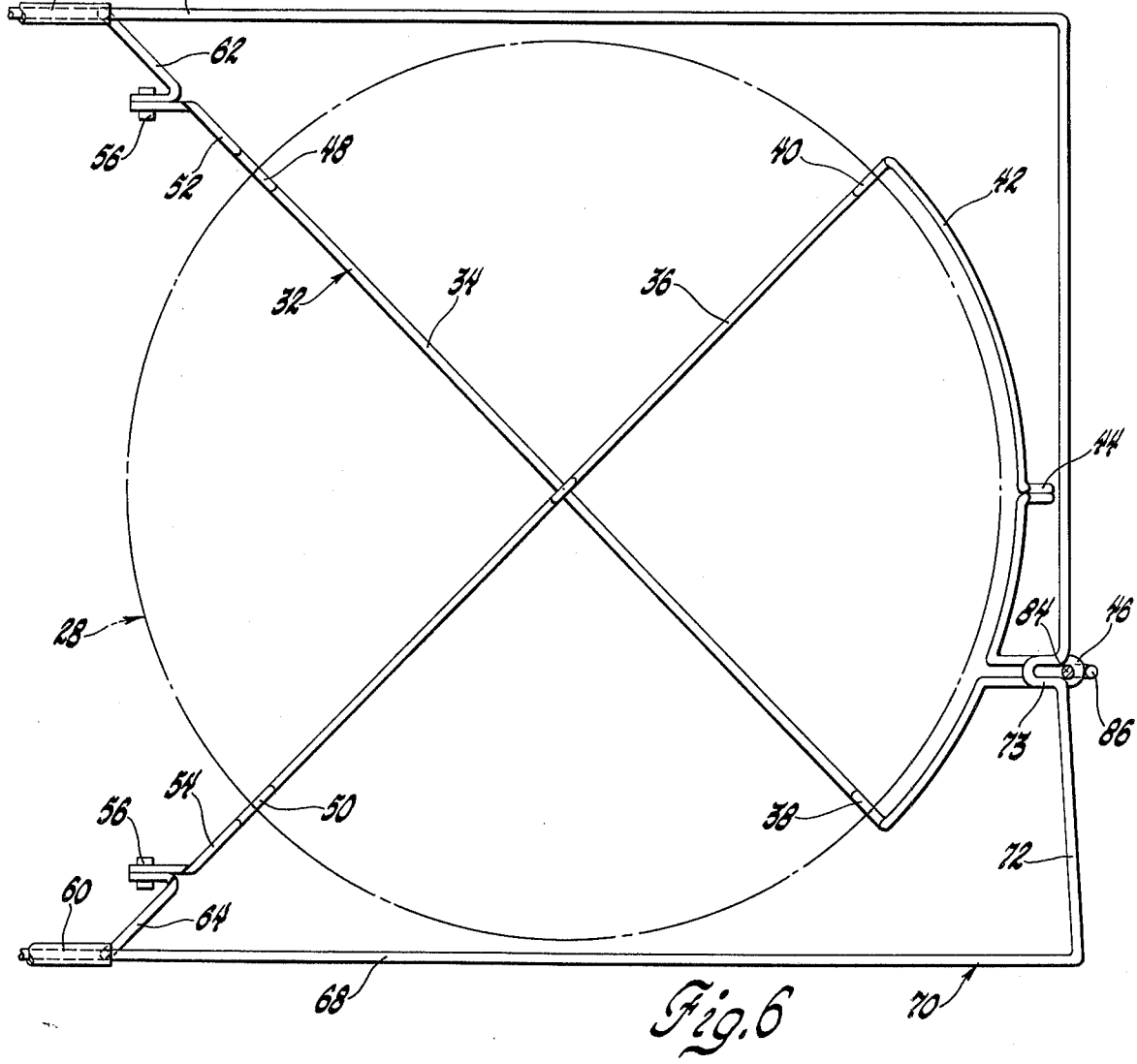
FIG. 6 is a view taken along lines 6—6 in FIG. 5 and looking in the direction of the arrows.

A spare tire and wheel assembly 28 is supported by the vehicle beneath the trunk floor 30 (shown in FIGS. 4 and 5). The spare tire assembly 28 includes a tire and a wheel which are supported horizontally as seen in FIG. 1. The tire assembly 28 is supported by a tire cradle 32 which is formed by continuous bent rod members. Extending beneath the tire are crossed arm portions 34, 36 as best shown in FIG. 6. The crossed arm portions 34, 36 overlie each other at about the midportion of the spare tire assembly 28. The rearward end portions are bent to extend vertically upward to form positioning portions 38, 40. Portions 38, 40 are integrally connected by a portion 42 which extends parallel and to the rear of the tire 28. At about the midpoint of the portion 42, the member is bent downward and then upward to form a handle portion 44, the purpose of which will be described more fully hereinafter. Also, as can be seen in FIGS. 3 and 6, a horizontally extending bend or loop 46 is formed in portion 42.

The forwardly located ends of the crossed arm portions 34, 36 extend vertically upward to form forward tire positioning portions 48, 50. Horizontally disposed end extensions 52, 54 are attached in a pivotal fashion to short arm members 62, 64 of guide members 58, 60 by fasteners 56. The guides 58, 60 are in the form of cylindrical members which encircle straight guide portions 66, 68 of a support assembly 70.

The tire cradle support 70 has a U-shaped configuration with the parallel legs or guide portions 66, 68 extending generally parallel to one another and in a fore and aft direction. A rearward portion 72 joins the leg portions 66, 68 and a loop 73 is formed therein in overlying relation to loop 46 of the cradle 32. The forward end portions 74, 76 of the legs 66, 68 are terminated in closed end portions which are attached to frame brackets 78 by fasteners 80. This method of fastening the legs 66, 68 permits the tire cradle support 70 to pivot downward from the position shown in FIG. 1 to the position shown in FIG. 2 where the rear end of the cradle 32 rests on the ground.

During operation of the vehicle, the cradle 32 and the cradle support 70 are pivoted vertically upward and held against the floor of the vehicle as shown in FIG. 1 by means of a combination handle, latch and lowering member 82. The member 82 consists of a lower portion 84 as shown in FIG. 5 which has a hooked end 86 adapted to engage the loop 46 of the tire cradle 32. The portion 84 extends through an opening 88 in the trunk floor 30. A fastener 90 joins lower end 84 with an upper end 85 in a manner so that the ends 84, 85 may rotate with respect to one another. In FIG. 1 the ends are rotated to a generally rightangle relationship and the upper portion 85 is attached to the floor by an overlying clip fastener 92. When removal of the spare tire is desired, the handle portion 94 and upper portion 85 are disengaged from fastener 92. Then the upper portion 85 is pivoted into alignment with the lower portion 86. Subsequently, the member 82 is lowered through opening 88 in the floor. This permits the tire cradle 32 and cradle support 70 to pivot downward about the axis extending through fasteners 80. Note that loop portions 46, 73 are in overlying relation so that engaging the hook portion 86 to the lower loop portion 46 of the tire cradle will support both the tire cradle 32 and the tire cradle support 70.

Once the tire cradle 32 and cradle support 70 are lowered with the rear end of the tire cradle 32 resting on the ground as shown in FIG. 2, the hook portion 86 is disengaged. Subsequently, the handle portion 44 is grasped to pull the tire cradle assembly 32 rearward to clear the overhang of the vehicle. During this final movement, guides 58 and 60 slide along the spaced parallel leg portions 66 and 68 of the cradle support 70. Once cleared of the rear overhang of the vehicle, the spare tire 28 may then be conveniently lifted from the tire cradle.

Although a single embodiment of the present invention has been illustrated and described in great detail, other embodiments and modifications are contemplated which fall within the scope of the following claims which define the invention.

What is claimed is as follows:

1. In a vehicle, an assembly to support a spare tire in a generally horizontal orientation beneath the vehicle floor and forward of the rear of the vehicle, comprising: a tire cradle of lightweight construction formed of bent rod members and including lower portions adapted to extend beneath the tire for vertical support thereof, upwardly angled portions integrally connected to the lower portions extending beneath the tire to locate said tire in a horizontal plane and a rearward portion extending adjacent the rear edge of the tire; a tire cradle support assembly having a generally U-shaped configuration also formed of lightweight bent rod construction including a pair of leg portions, each extending in fore and aft orientation with respect to the vehicle and in spaced parallelism to one another, the forward ends of said leg portions being attached to the vehicle in a manner permitting pivotal movement of the tire cradle support, the rearward end portions of the cradle support leg portions being integrally joined by an intermediate portion spaced above the rearward portion of said tire cradle; a slidable guide member supported on each of said leg portions; means attaching each of the forward ends of said tire cradle to one of said guide members for permitting limited rotation of said cradle with respect to said cradle support; elongated actuating means for supporting said tire cradle and cradle support in an upward stowed position and extending through opening in the vehicle floor for selective raising and lowering of the rear portion of said tire cradle and cradle support from above, the engagement between the lower end of the elongated actuating means and the tire cradle and support being selectively detachable once the tire is lowered to rest on the ground for permitting subsequent rearward sliding movement of the guide members along said leg portions and corresponding rearward movement of the tire and tire cradle with respect to said cradle support and the vehicle to clear the tire of the vehicle rear overhang.

2. In a vehicle, an assembly to support a spare tire in a generally horizontal orientation beneath the vehicle floor and forward of the rear of the vehicle, comprising: a tire cradle of lightweight construction formed of bent rod members and including lower portions extending beneath the tire for vertical support thereof, upwardly angled portions to either end of the lower portions to locate said tire in a horizontal plane and a rearward portion extending adjacent the rear edge of the tire; a tire cradle support assembly having a generally U-shaped configuration also formed of lightweight bent rod construction including a pair of leg portions each extending in fore and aft orientation with respect to the vehicle and in spaced parallelism to one another, the forward ends of said leg portions being attached to the vehicle in a manner permitting pivotal movement of the tire cradle support, the rearward end portions of the cradle support leg portions being integrally joined by an intermediate portion spaced above the rearward portion of said tire cradle; means on said tire cradle and said cradle support in overlying and complementary relation to permit simultaneous upward and downward movement of both members by raising and lowering said tire cradle; a guide member slidably supported on each of said leg portions; means attaching each of the forward ends of said tire cradle to one of said guide members for permitting limited rotation of said cradle with respect to said cradle support; elongated actuating means attached at a lower end to said tire cradle and extending upwardly through an opening in the vehicle floor for selective and remote lowering of the rearward portions of said tire cradle and cradle support, the attachment between the lower end of the actuating means and the tire cradle being selectively detachable once the tire cradle is lowered to rest on the ground to permit subsequent rearward sliding movement of the guide members along said leg portions and corresponding rearward movement of the tire and tire cradle with respect to the cradle support and the vehicle to clear the tire of the vehicle rear overhang.

3. In a vehicle, an assembly to support a spare tire in a generally horizontal orientation beneath the vehicle floor and forward of the rear of the vehicle, comprising; a tire cradle of lightweight construction formed of bent rod members and including crossed lower portions adapted to extend beneath the tire for vertical support thereof, upwardly angled portions immediately to either end of said lower crossed portions to locate said tire in a horizontal plane and a rearward portion extending adjacent the rear edge of the tire; a cradle support assembly having a generally U-shaped configuration also formed of lightweight bent rod construction including a pair of straight leg portions, each extending in fore and aft orientation with respect to the vehicle and in spaced parallelism to one another, the forward ends of said leg portions being attached to the vehicle in a manner permitting pivotal movement of the tire cradle support, the rearward end portions of the cradle support leg portions being joined by an intermediate portion spaced above the rearward portion of said tire cradle; means on said rearward end portions of said cradle and cradle support including forwardly and rearwardly directed loops with portions aligned in the vertical direction so that the upwardly spaced portion of the cradle support is supported by the lower rear portion of the tire cradle member; a guide member slidable on each of said leg portions; means attaching each of the forward ends of said tire cradle to one of said guide members for permitting limited rotation of said cradle with respect to said cradle support; elongated actuating means having a handle-forming top portion in the vehicle and extending downward through an opening in the vehicle floor with a lower end portion attached to said loop of said rear end of the tire cradle for selective and remote lowering of the rearward portions of said tire cradle and cradle support, said actuating means attachment between the cradle and the lower end being selectively detachable after the cradle is lowered to the ground to permit subsequent rearward sliding of the guide members on said leg portions and resultant rearward movement of the tire and tire cradle to clear the tire of the vehicle rear overhang.

* * * * *